(12) United States Patent
Williams et al.

(10) Patent No.: US 10,949,346 B2
(45) Date of Patent: Mar. 16, 2021

(54) DATA FLUSH OF A PERSISTENT MEMORY CACHE OR BUFFER

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); John Dodson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 27 days.

(21) Appl. No.: 16/184,597

(22) Filed: Nov. 8, 2018

(65) Prior Publication Data

US 2020/0151094 A1 May 14, 2020

(51) Int. Cl.
| | | |
|---|---|---|
| *G06F 3/06* | (2006.01) | |
| *G06F 12/00* | (2006.01) | |
| *G06F 13/00* | (2006.01) | |
| *G06F 12/0804* | (2016.01) | |

(52) U.S. Cl.
CPC .. *G06F 12/0804* (2013.01); *G06F 2212/1032* (2013.01)

(58) Field of Classification Search
CPC .................................................. G06F 12/0804
USPC .......................................................... 711/135
See application file for complete search history.

(56) References Cited

U.S. PATENT DOCUMENTS

| | | | |
|---|---|---|---|
| 5,355,467 A | 10/1994 | MacWilliams et al. | |
| 5,701,516 A | 12/1997 | Cheng et al. | |
| 5,854,637 A | 12/1998 | Sturges | |
| 5,996,054 A | 11/1999 | Ledain et al. | |
| 6,460,114 B1 | 10/2002 | Jeddeloh | |
| 6,711,652 B2 | 3/2004 | Arimilli et al. | |
| 6,981,070 B1 | 12/2005 | Luk et al. | |
| 7,062,675 B1 | 6/2006 | Kemeny et al. | |
| 2003/0009623 A1 | 1/2003 | Arimilli et al. | |
| 2003/0009643 A1* | 1/2003 | Arimilli | G06F 12/0831 711/155 |
| 2003/0037071 A1 | 2/2003 | Harris et al. | |
| 2003/0084252 A1* | 5/2003 | Talagala | G06F 12/0866 711/135 |
| 2006/0143407 A1 | 6/2006 | Humlicek | |
| 2006/0190510 A1* | 8/2006 | Gabryjelski | G06F 13/102 |
| 2007/0180196 A1* | 8/2007 | Guthrie | G06F 12/0822 711/141 |
| 2008/0209109 A1 | 8/2008 | Lasser | |
| 2009/0193194 A1* | 7/2009 | Drapala | G06F 12/0831 711/132 |

(Continued)

*Primary Examiner* — Mohamed M Gebril
(74) *Attorney, Agent, or Firm* — David M. Quinn; Brian F. Russell

(57) ABSTRACT

A data processing system includes a plurality of processing units and a system memory coupled to a memory controller. The system memory includes a persistent memory device and a non-persistent cache interposed between the memory controller and the persistent memory device. The memory controller receives a flush request of a particular processing unit among the plurality of processing units, the flush request specifying a target address. The memory controller, responsive to the flush request, ensures flushing of a target cache line of data identified by target address from the non-persistent cache into the persistent memory device.

13 Claims, 13 Drawing Sheets

(56) References Cited

U.S. PATENT DOCUMENTS

| | | | |
|---|---|---|---|
| 2010/0064108 A1* | 3/2010 | Harris | G06F 12/0831 |
| | | | 711/146 |
| 2010/0077136 A1* | 3/2010 | Ware | G06F 12/0804 |
| | | | 711/103 |
| 2010/0262720 A1* | 10/2010 | Daly, Jr. | G06F 13/4022 |
| | | | 710/5 |
| 2010/0281204 A1* | 11/2010 | Yano | G06F 12/0897 |
| | | | 711/103 |
| 2011/0066808 A1 | 3/2011 | Flynn et al. | |
| 2017/0242822 A1* | 8/2017 | Malladi | H04L 67/1097 |
| 2018/0095834 A1* | 4/2018 | Fernando | G06F 3/067 |
| 2018/0095884 A1* | 4/2018 | Kaminski | G06F 3/0611 |
| 2018/0285264 A1* | 10/2018 | Kayiran | G06F 12/0817 |
| 2020/0151094 A1* | 5/2020 | Williams | G06F 12/0833 |

* cited by examiner

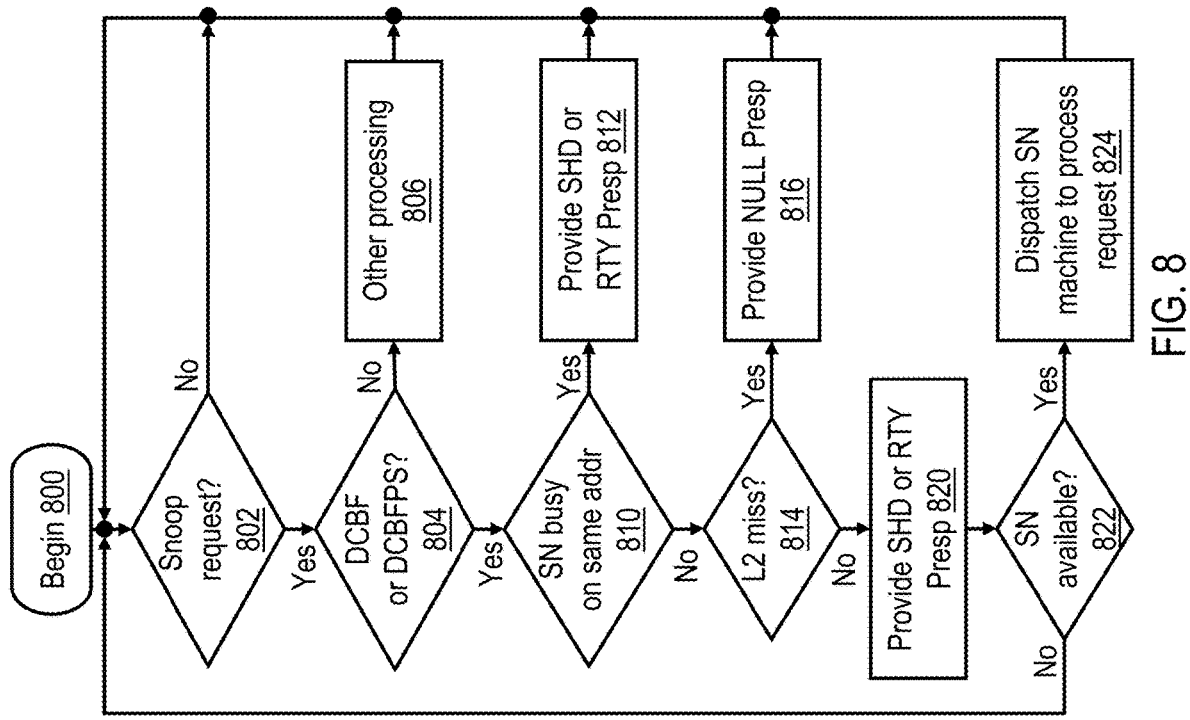

DATA FLUSH OF A PERSISTENT MEMORY CACHE OR BUFFER

BACKGROUND OF THE INVENTION

The present invention relates generally to data processing and, in particular, flushing data to a persistent memory having an associated cache or buffer.

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of shared memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a hardware-based cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of coherence states stored in association with the cache lines of each cache hierarchy, as well as a set of coherence messages utilized to communicate the coherence state information between cache hierarchies and a set of actions taken by the cache memories in response to the coherence messages to preserve coherency. In a typical implementation, the coherence state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request.

In addition to the hardware management of cache coherency described above, at least some MP systems also support software management of cache coherency through the implementation of specific cache management instructions. For example, the POWER® architecture supports the data cache block flush (DCBF) instruction, which causes each of the processing units in the MP system to invalidate a specified cache line of data, if resident in its cache hierarchy, and if the cache line is modified with respect to main storage, to push a copy of the modified cache line to the memory controller.

BRIEF SUMMARY

The conventional DCBF instruction disclosed above is sufficient to ensure that a target cache line of data is flushed from the cache hierarchies of the processing units to the memory controller of main memory, for example, for coherence purposes. However, the conventional DCBF instruction does not guarantee that the target cache line of data is actually persistently stored in main memory. For example, some memory systems include a persistent memory device, such as battery-backed Dynamic Random Access Memory (DRAM) or flash memory, which retains the data stored therein even if external power is removed, whether through an unexpected power outage or through a planned power down sequence. Memory systems including persistent memory devices often include one or more levels of non-persistent data buffering or data caching implemented between the memory controller of the main memory and the persistent memory device. Because this intermediate data buffering and/or data caching is not itself persistent, data loss can occur if external power is removed from the memory system before data residing in the intermediate data buffering and/or data caching facilities are written into the persistent memory device.

Accordingly, the present disclosure provides an improved technique for data flushing that ensures that data flushed from upper levels of the memory hierarchy are written into persistent memory. In at least one embodiment, a data processing system includes a plurality of processing units and a system memory coupled to a memory controller. The system memory includes a persistent memory device and a non-persistent cache interposed between the memory controller and the persistent memory device. The memory controller receives a flush request of a particular processing unit among the plurality of processing units, the flush request specifying a target address. The memory controller, responsive to the flush request, ensures flushing of a target cache line of data identified by target address from the non-persistent cache into the persistent memory device.

BRIEF DESCRIPTION OF THE SEVERAL VIEWS OF THE DRAWINGS

FIG. 8 is a high level logical flowchart of an exemplary method by which dispatch logic of a processing unit processes snooped flush requests in accordance with one embodiment;

DETAILED DESCRIPTION

Figure 1:
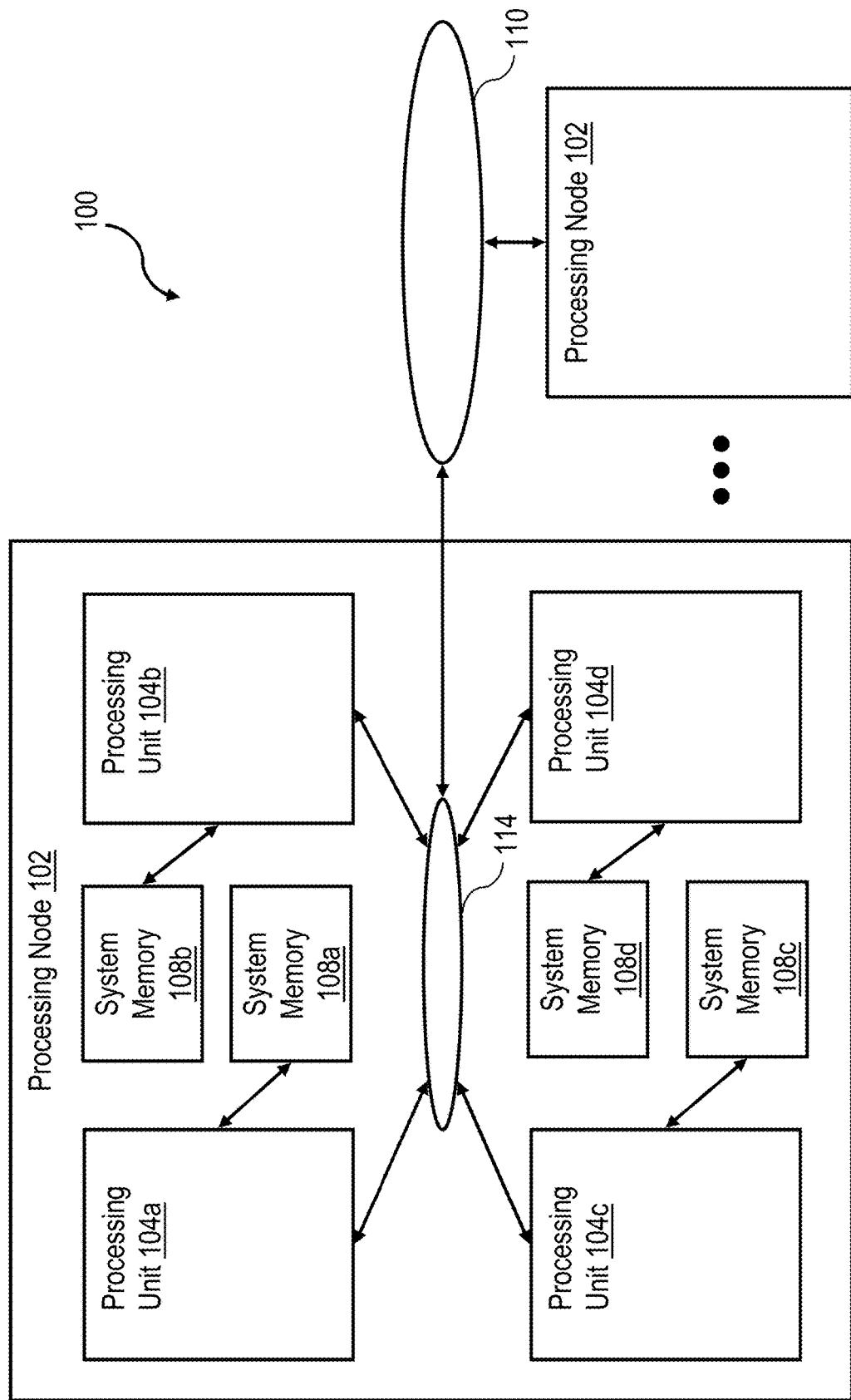
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form an interconnect fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of memory storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
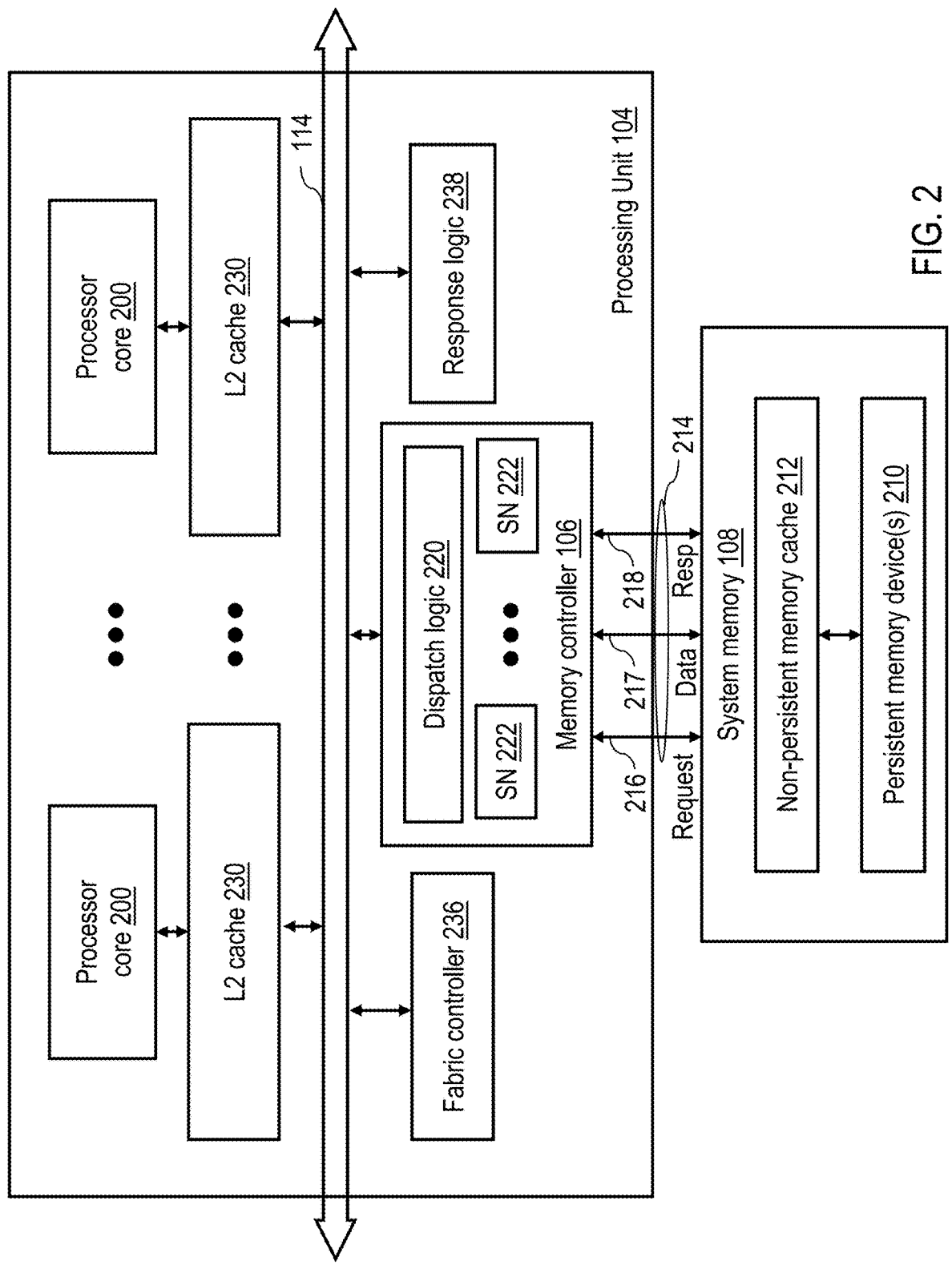
FIG. 2 is a more detailed block diagram of an exemplary processing unit and associated system memory in accordance with one embodiment.

Referring now to FIG. 2, there is depicted a more detailed block diagram of an exemplary processing unit 104 in accordance with one embodiment. In the depicted embodiment, each processing unit 104 is an integrated circuit including one or more processor cores 200 for processing instructions and data. In a preferred embodiment, each processor core 200 supports simultaneous multithreading (SMT) and thus is capable of independently executing multiple hardware threads of execution simultaneously.

The operation of each processor core 200 is supported by a multi-level memory hierarchy having at its lowest level a shared system memory 108 accessed via an integrated memory controller 106. As illustrated, shared system memory 108 includes one or more persistent memory devices 210, such as battery-backed DRAM and/or one or more flash memory modules. System memory 108 additionally includes a non-persistent memory cache 212 (or buffer) interposed between memory controller 106 and persistent memory devices 200. As will be appreciated, non-persistent memory cache 212 may buffer copies of memory blocks in persistent memory devices 200 whose contents are, until flushed into persistent memory devices 210, inconsistent with the corresponding memory blocks in persistent memory devices 210. System memory 108 is coupled to its associated memory controller 106 via a communication link 214 including a request channel 216, data channel 217, and response channel 218.

Memory controller 106 includes dispatch logic 220 and multiple memory controller (MC) snoop (SN) machines 222. As described in detail below, dispatch logic 220 receives (snoops) requests on the interconnect fabric, and if necessary, dispatches MC SN machines 222 to service those requests. In particular, as described below with reference to FIGS. 6B and 7B, responsive to a flush request that specifies flushing of a target cache line to persistent memory devices 200, a MC SN machine 222 ensures that the target cache line is flushed from non-persistent memory cache 212 to persistent memory devices 210.

Still referring to FIG. 2, at its upper levels, the multi-level memory hierarchy of processor cores 200 includes one or more levels of cache memory, which in the illustrative embodiment include a store-through level one (L1) cache 302 (see FIG. 3) within and private to each processor core 200, and a respective store-in level two (L2) cache 230 for each processor core 200. Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 236 responsible for controlling the flow of operations on the interconnect fabric comprising local interconnect 114 and system interconnect 110 and for implementing the coherency communication required to implement the selected cache coherency protocol. Processing unit 104 further includes an instance of response logic 238, which computes and broadcasts on the interconnect fabric, for each request, a "combined response" representing the systemwide coherence response for the request. Computation of the combined response is discussed in greater detail below with reference to FIGS. 4 and 10.

Figure 3:
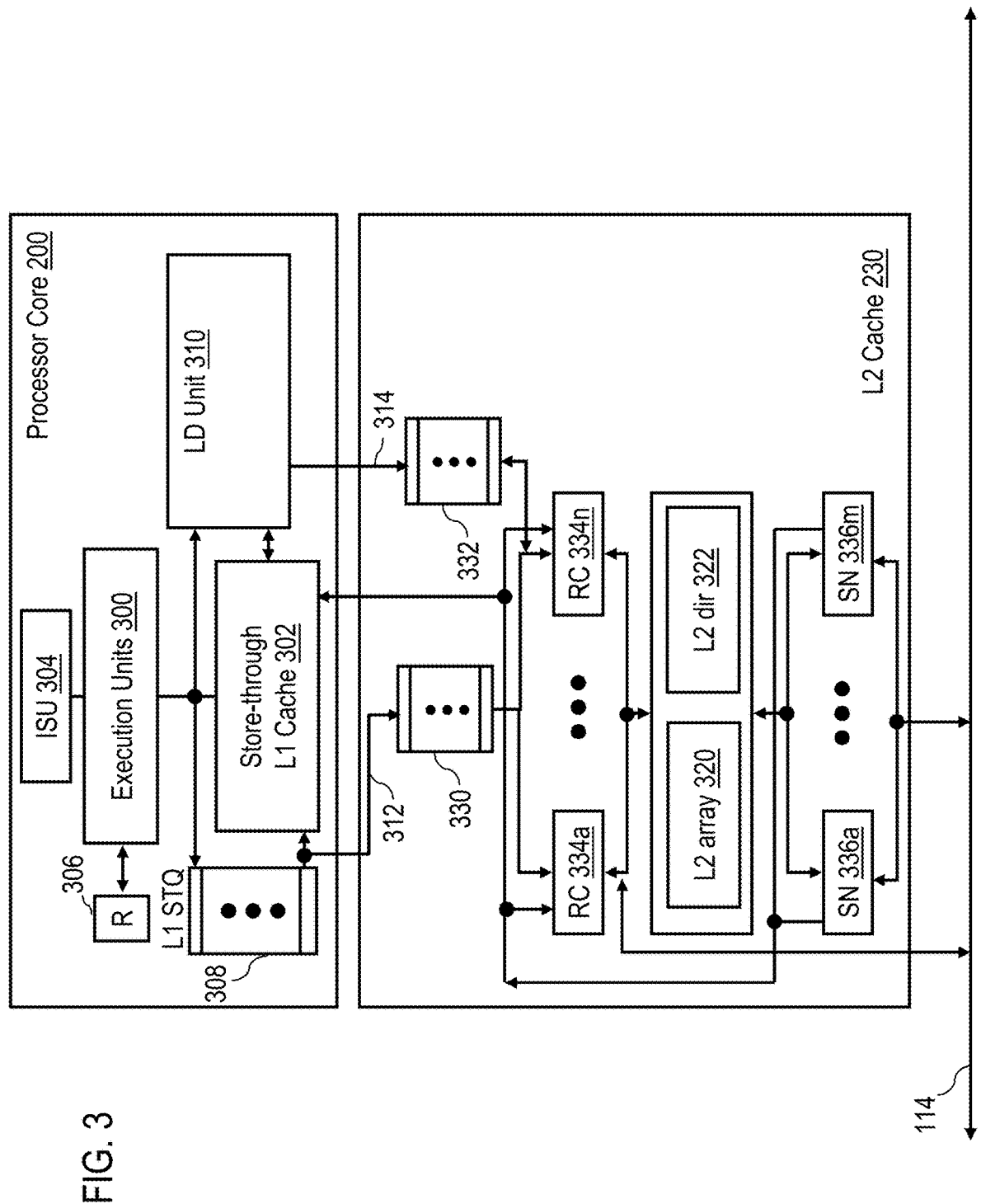
FIG. 3 is a more detailed block diagram of a processor core and lower level cache memory in accordance with one embodiment.

With reference now to FIG. 3, there is illustrated a more detailed block diagram of an exemplary embodiment of a processor core 200 and its affiliated L2 cache 230 in accordance with one embodiment. In the illustrated embodiment, processor core 200 includes one or more execution unit(s) 300, which execute instructions from multiple simultaneous hardware threads of execution. The instructions can include, for example, arithmetic instructions, logical instructions, and memory referent instructions (e.g., loads and stores), as well as cache management instructions such as the data cache block flush (DCBF) and data cache block flush persistent store (DCBFPS) instructions. Execution unit(s) 300 can generally execute instructions of a hardware thread in any order as long as data dependencies and explicit orderings mandated by synchronization instructions are observed. Instructions are fetched from the memory hierarchy and dispatched to execution units 300 for execution by an instruction sequencing unit (ISU) 304. Memory blocks obtained from the distributed shared memory system by load accesses are buffered in one or more register files (RFs) 306, and memory blocks updated by store accesses are written to the distributed shared memory system from the one or more register files 306.

Processor core 200 also includes an L1 store queue 308 that temporarily buffers store and synchronization requests generated by execution of corresponding store and synchronization instructions by execution unit(s) 300. Because L1 cache 302 is a store-through cache, meaning that coherence is fully determined at a lower level of cache hierarchy (e.g., at L2 cache 230), requests flow through L1 STQ 308 and then pass via bus 312 to L2 cache 230 for processing. Processor core 200 additionally includes a load unit 310 that temporarily buffers load requests that miss in L1 cache 302. Load unit 310 is coupled to L2 cache 230 by a bus 314.

Still referring to FIG. 3, L2 cache 230 includes a L2 cache array 320 and a L2 directory 322 of the contents of cache array 320. Assuming L2 cache array 320 and L2 directory 322 are set associative as is conventional, storage locations in system memories 108 are mapped to particular congruence classes within cache array 320 utilizing predetermined index bits within the system memory (real) addresses. The particular memory blocks stored within the cache lines of L2 cache array 320 are recorded in L2 directory 322, which contains one directory entry for each cache line. While not expressly depicted in FIG. 3, it will be understood by those skilled in the art that each directory entry in cache directory 322 includes various fields, for example, a tag field that identifies the real address of the memory block held in the corresponding cache line of L2 cache array 320, a state field that indicates the coherency state of the cache line, an LRU (Least Recently Used) field indicating a replacement order for the cache line with respect to other cache lines in the same congruence class, and inclusivity bits indicating whether the memory block is held in the associated L1 cache 302.

L2 cache 230 includes an L2 store queue (STQ) 330 that receives storage-modifying requests and synchronization requests from L1 STQ 304 via bus 312 and buffers such requests. L2 cache 230 similarly includes a L2 load queue (LDQ) 332 that receives load requests for load unit 310 via bus 314 and buffers such requests. In order to service the requests buffered in L2 STQ 330 and L2 LDQ 332, L2 cache 230 implements multiple Read-Claim (RC) machines 334a-334n, which are each capable of independently and concurrently servicing a request dispatched from one of queues 330-332. In order to service remote requests originating from processor cores 200 other than the affiliated processor core 200, L2 cache 230 also includes multiple L2 snoop (SN) machines 336a-336m. Each snoop machine 336 can independently and concurrently handle a remote request snooped from local interconnect 114. As will be appreciated, the servicing of memory access requests by RC machines 334 may require the replacement or invalidation of memory blocks within cache array 320 (and L1 cache 302). Accordingly, L2 cache 230 may also additionally include unillustrated CO (castout) machines that manage the removal and writeback of memory blocks from cache array 320.

Figure 4:
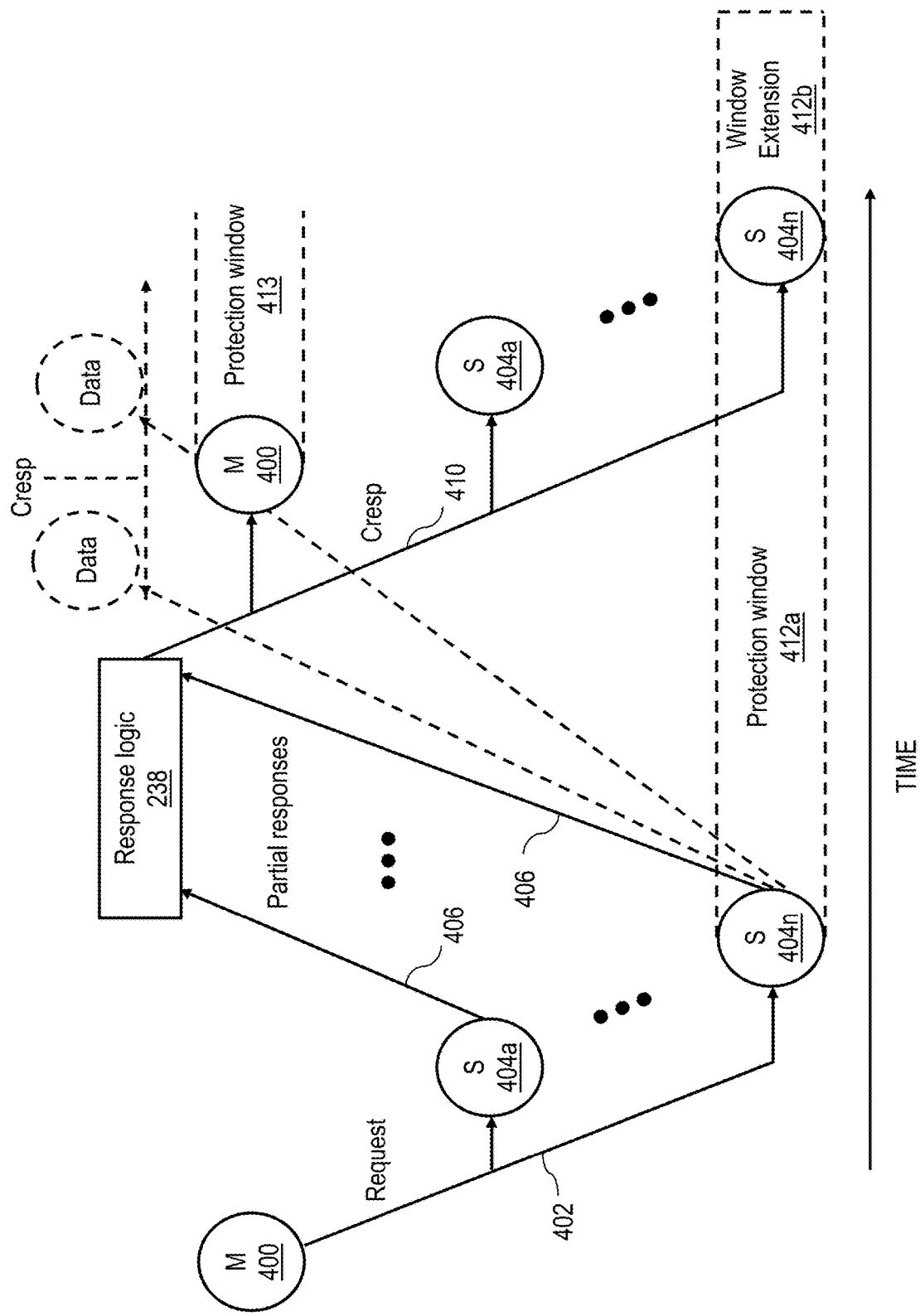
FIG. 4 is a time-space diagram of a request and associated coherence messages on an interconnect fabric of a data processing system in accordance with one embodiment.

Referring now to FIG. 4, there is depicted a time-space diagram of an exemplary interconnect operation on the interconnect fabric of data processing system 100 of FIG. 1. The interconnect operation begins when a master 400 (e.g., a read-claim (RC) machine 334 of an L2 cache 230 (see, e.g., FIG. 3)) issues a request 402 on the interconnect fabric. Request 402 preferably includes at least a transaction type indicating a type of desired access and a resource identifier (e.g., target real address) indicating a resource to be accessed by the request. Common types of requests include those set forth below in Table I.

TABLE I

| Request | Description |
| --- | --- |
| CASTOUT | Copies the image of a memory block from a higher level of memory to a lower level of memory in preparation for the destruction of the higher level copy |
| DCLAIM (Data Claim) | Requests authority to promote an existing query-only copy of memory block to a unique copy with the intent to update (modify) it and requires destruction of other copies, if any |
| DCBF (Data Cache Block Flush) | Requests authority to invalidate each copy of a memory block held in a processing unit cache and to flush, to the memory controller, modified data, if any |
| DCBFPS (DCBF Persistent Store) | Requests authority to invalidate each copy of a memory block held in a processing unit cache and to flush, to persistent memory devices, modified data, if any |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| WRITE | Requests authority to create a new unique copy of a memory block without regard to its present state and immediately copy the image of the memory block from a higher level memory to a lower level memory in preparation for the destruction of the higher level copy |

Request 402 is received by snoopers 404 (e.g., L2 SN machines 336 of L2 caches 230 and MC SN machines 222 of MCs 106) distributed throughout data processing system 100. In general, with some exceptions L2 SN machines 336 in the same L2 cache 230 as the master 400 of request 402 do not snoop request 402 (i.e., there is generally no self-snooping) because a request 402 is transmitted on the interconnect fabric only if the request 402 cannot be serviced internally by a processing unit 104. Snoopers 404 that receive and process requests 402 each provide a respective partial response (Presp) 406 representing the response of at least that snooper 404 to request 402. A MC SN machine 222 within an MC 106 determines the partial response 406 to provide based, for example, upon whether the MC SN machine 222 is responsible for the request address and whether it has resources available to service the request 402. An L2 cache 230 may determine its partial response 406 based on, for example, the availability of a L2 snoop machine 336 to handle the request, the availability of its L2 directory 322, and the coherence state associated with the target real address in L2 directory 322.

The partial responses 406 of snoopers 404 are logically combined either in stages or all at once by one or more instances of response logic 238 to determine a system-wide combined response (Cresp) 410 to request 402. In one embodiment, which is assumed hereinafter, the instance of response logic 238 responsible for generating Cresp 410 is located in the processing unit 104 containing the master 400 that issued request 402. Response logic 238 provides Cresp 410 to master 400 and snoopers 404 via the interconnect fabric to indicate the system-wide coherence response (e.g., success, failure, retry, etc.) to request 402. If Cresp 410 indicates success of request 402, Cresp 410 may indicate, for example, a data source for a target memory block of request 402, a coherence state in which the requested memory block is to be cached by master 400 (or other caches), and whether "cleanup" operations invalidating the requested memory block in one or more caches are required.

In response to receipt of Cresp 410, one or more of master 400 and snoopers 404 typically perform one or more additional actions in order to service request 402. These additional actions may include supplying data to master 400, invalidating or otherwise updating the coherence state of data cached in one or more L2 caches 230, performing castout operations, writing back data to a system memory 108, etc. If required by request 402, a requested or target memory block may be transmitted to or from master 400 before or after the generation of Cresp 410 by response logic 238.

In the following description, the partial response 406 of a snooper 404 to a request 402 and the actions performed by the snooper 404 in response to the request 302 and/or its combined response 410 may be described with reference to whether that snooper is a Highest Point of Coherency (HPC), a Lowest Point of Coherency (LPC), or neither with respect to the request (target) address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1-3, the LPC will be the memory controller 106 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1-3, the HPC, if any, will be a particular L2 cache 230. Although other indicators may be utilized to designate an HPC for a memory block, a preferred embodiment of the present invention designates the HPC, if any, for a memory block utilizing selected cache coherence state(s) within the L2 directory 322 of an L2 cache 230.

Still referring to FIG. 4, the HPC, if any, for a memory block referenced in a request 402, or in the absence of an HPC, the LPC of the memory block, preferably has the responsibility of protecting the transfer of coherence ownership of a memory block, if necessary, in response to a request 402. In the exemplary scenario shown in FIG. 4, a snooper 404n at the HPC (or in the absence of an HPC, the LPC) for the memory block specified by the request address of request 402 protects the transfer of coherence ownership of the requested (target) memory block to master 400 during a protection window 412a that extends from the time that snooper 404n determines its partial response 406 until snooper 404n receives Cresp 410 and during a subsequent window extension 412b extending a programmable time beyond receipt by snooper 404n of Cresp 310. During protection window 412a and window extension 412b, snooper 404n protects the transfer of coherence ownership of the target memory block from snooper 404n to mater 400 by providing partial responses 406 (e.g., retry (RTY) partial responses) to other requests specifying the same target address. Such partial responses 406 prevent other masters from obtaining coherence ownership of the target memory block until coherence ownership has been successfully transferred from snooper 404n to master 400. If necessary, following receipt of combined response 410, master 400 may likewise initiate a protection window 413 to protect its acquisition of coherence ownership of the target memory block. Protection window 413 ensures that any master subsequently requesting the target memory block will receive any new value of the target memory block created by master 400 rather than a stale value.

Because snoopers 404 all have limited resources for handling the CPU and I/O requests described above, several different levels of partial responses and corresponding Cresps are possible. For example, if a memory controller 106 that is responsible for a requested memory block has a MC SN machine 222 available to handle a request 402, the memory controller 106 may respond with a partial response indicating that it is able to serve as the LPC for the request. If, on the other hand, the memory controller 106 has no MC SN machine 222 available to handle the request, the memory controller 106 may respond with a partial response indicating that it is the LPC for the memory block, but is unable to currently service the request. Similarly, an L2 cache 230 may require an available L2 SN machine 336 and access to L2 directory 322 in order to handle a request 402. Absence of access to either (or both) of these resources results in a partial response (and corresponding Cresp) signaling an inability to service the request 402 due to absence of a required resource.

As is further illustrated in FIG. 4, snooper 404n may return data (e.g., for a READ or RWITM request) to master 400 (e.g., an L2 cache 230) before or after master 400 receives the Cresp (for the READ or RWITM request) from response logic 238.

As described above, in a data processing system 100 in which one or more of system memories 108 include an intermediate buffer or cache interposed between memory controller 106 and persistent memory devices 210, a conventional DCBF request cannot guarantee that a modified cache line has been deposited in persistent memory devices 210 since a conventional DCBF request only flushes the modified cache line from the caches of processing units 104 to memory controller 106. As a result, the modified cache line may remain buffered in the intermediate buffer/cache represented by non-persistent memory cache 212.

To address this issue, a new request type referred to herein as data cache block flush persistent store (DCBFPS) is introduced. In contrast to a conventional DCBF request, a DCBFPS request that completes successfully guarantees that the target memory block is flushed all the way to persistent memory devices 210 rather than just to memory controller 106. A code sequence containing a DCBFPS instruction can be, for example:

st X
DCBFPS X

In this code sequence, the STORE (st) instruction requests an update to a variable X in memory. After the store request is performed, but prior to the execution of the DCBFPS instruction, the copy of variable X in the cache hierarchy of the executing processing unit will be updated, but the corresponding copy of variable X in main memory will still retain its prior value. Execution of the DCBFPS instruction will then flush the updated value of variable X out the cache hierarchy of the executing processing unit, through non-persistent memory cache 212 and/or any like buffering, and into the persistent memory devices 210 of the main memory. To promote understanding of the inventions disclosed herein, the processing of a DCBF and DCBFPS requests are now described from inception to completion with reference to FIGS. 5-10.

Figure 5:
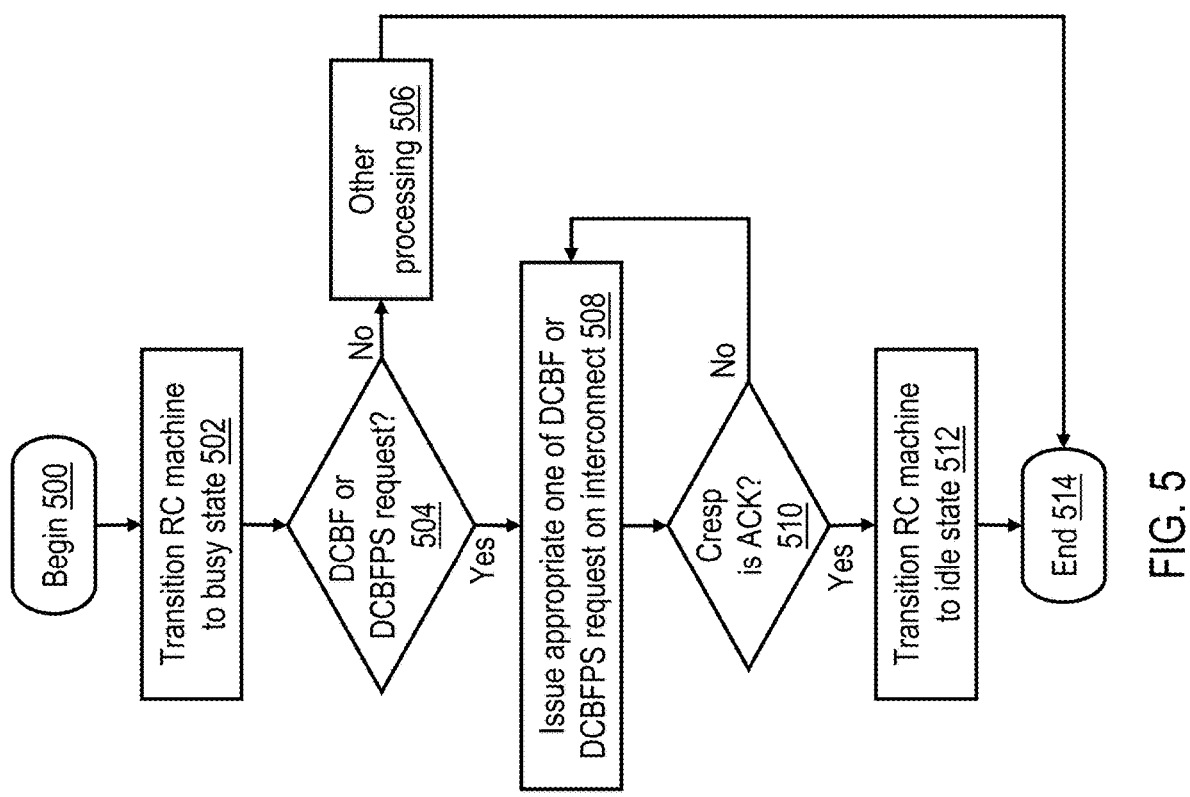
FIG. 5 is a high level logical flowchart of an exemplary method by which a processing unit issues flush requests on an interconnect fabric of a data processing system in accordance with one embodiment.

With reference now to FIG. 5, there is illustrated a high level logical flowchart of an exemplary method by which a processing unit issues flush requests on an interconnect fabric of a data processing system in accordance with one embodiment. The illustrated process begins at block 500, for example, in response to dispatch of an RC machine 334 of an L2 cache 230 to service a request of the associated processor core 200. In response to dispatch of the RC machine 334, the RC machine 334 transitions from an idle state to a busy state (block 502) and determines at block 504 whether or not the request of the associated processor core 200 is a DCBF or DCBFPS request. If not, RC machine 334 performs other processing generally illustrated at block 506. Thereafter, the process of FIG. 5 ends at block 514.

Referring again to block 504, in response to a determination that the request of the associated processor core 200 is a DCBF or DCBFPS request, RC machine 334 issues a broadcast of the appropriate one of a DCBF or DCBFPS request on the interconnect fabric of data processing system 100 (block 508). This request includes at least a transaction type identifying the request type (e.g., DCBF or DCBFPS) and a target address of a cache line to be flushed. As indicated at block 510, RC machine 334 continues to iteratively issue this flush request on the interconnect fabric of data processing system 100 until RC machine 334 receives an ACK combined response rather than a RTY (retry) combined response. This ACK combined response indicates that the target cache line has been flushed either to the relevant memory controller 106 (for a DCBF request) or to persistent memory devices 210 (for a DCBFPS request). In response to receiving a ACK combined response, RC machine 334 transitions back to an idle state, making the RC machine 334 available to service another request (block 512). Thereafter, the process of FIG. 5 ends at block 514.

Figure 6A:
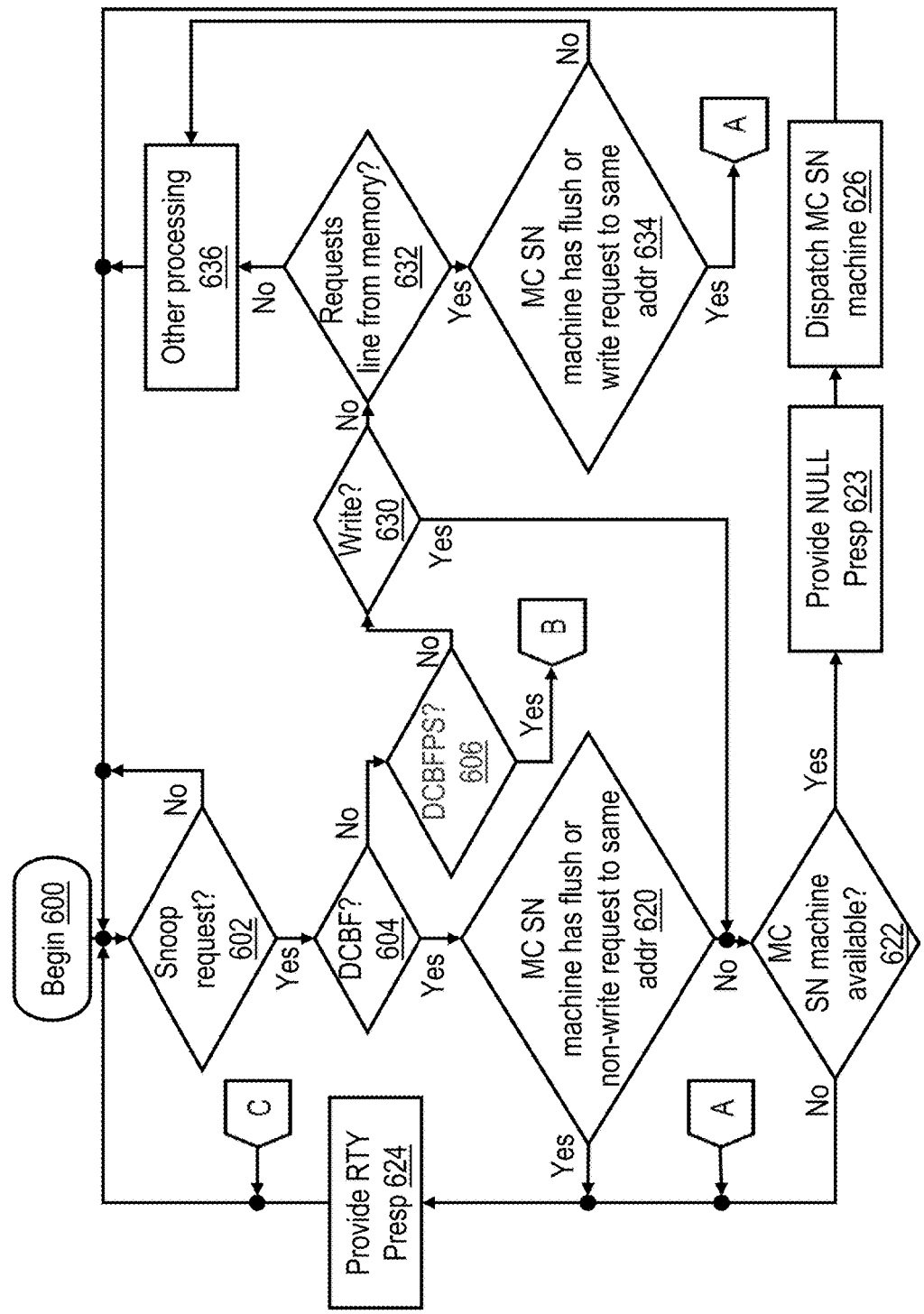
FIGS. 6A-6B together form a high level logical flowchart of an exemplary method by which dispatch logic of a memory controller of a system memory handles snooped flush requests in accordance with one embodiment.
Figure 6B:
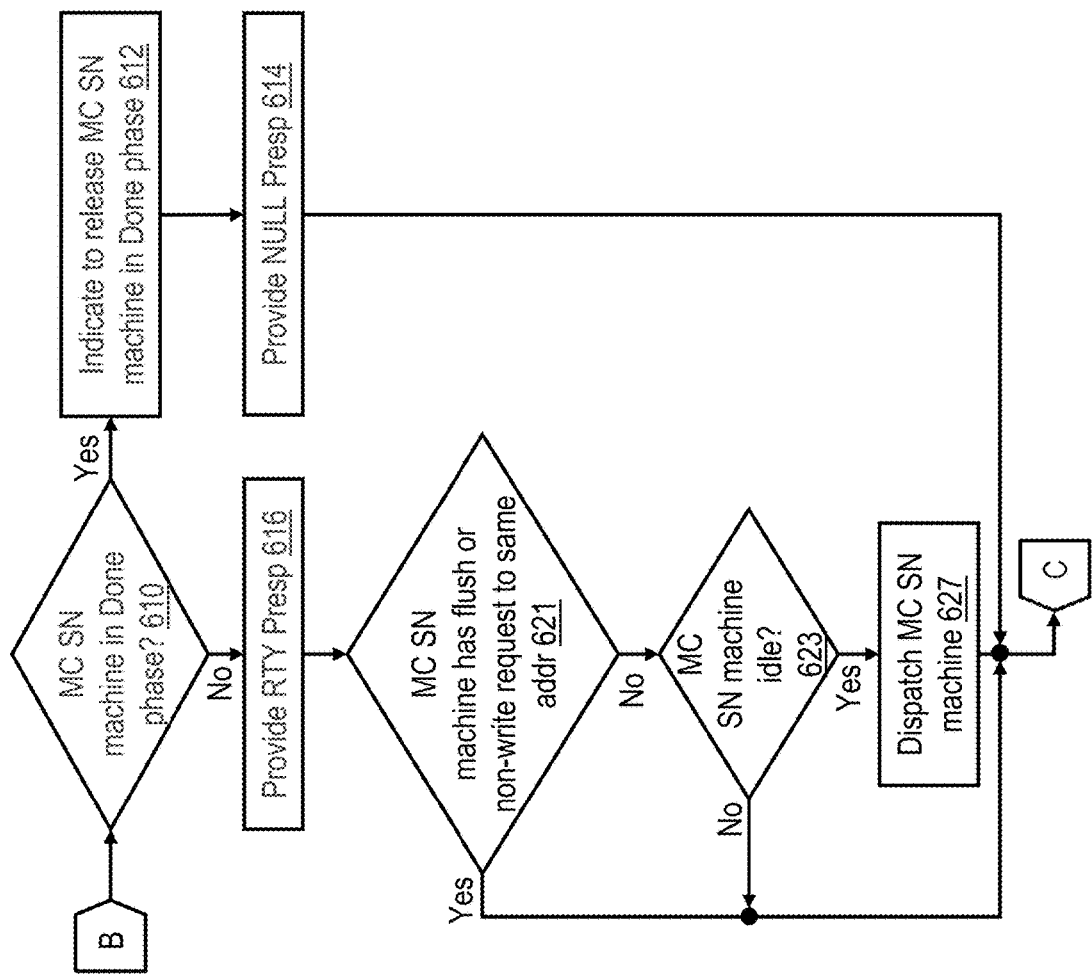

With reference now to FIGS. 6A-6B, there is depicted a high level logical flowchart of an exemplary method by which dispatch logic 220 of a memory controller 106 of a system memory 108 handles snooped flush requests (e.g., DCBF and DCBFPS requests) in accordance with one embodiment. The illustrated process begins at block 600 and then proceeds to block 602, which illustrates dispatch logic 220 determining whether or not a request has been snooped on the interconnect fabric. If not, the process of FIG. 6A iterates at block 602. In response to a determination at block 602 that a request has been snooped on the interconnect fabric, dispatch logic 220 determines at block 604 whether or not the request snooped on the interconnect fabric is a DCBF request. If not, the process passes to block 606, which illustrates a determination of whether or not the snooped request is a DCBFPS request. If so, the process proceeds through page connector B to FIG. 6B, which is described below. If, however, the snooped request is not a DCBF or DCBFPS request, the process passes to block 630, which is described below.

Returning to block 604, in response to a determination that the snooped request is a DCBF request, dispatch logic 220 additionally determines at block 620 whether or not any local MC SN machine 222 is currently busy servicing a flush or non-write request to the same target address as the DCBF request snooped at block 602. If so, dispatch logic 220 provides a RTY partial response to the DCBF request snooped at block 602 (block 624). As described below with reference to FIG. 10, this RTY partial response will cause a RTY combined response to be provided to the RC machine 334 that issued the DCBF request. Following block 624, the process of FIG. 6A returns to block 602, which has been described.

Returning to block 620, if a determination is made that no local MC SN machine 222 is currently busy servicing a flush or non-write request to the same target address as the DCBF request snooped at block 602, dispatch logic 222 additionally determines at block 622 whether or not a local MC SN machine 222 of its memory controller 106 is currently available to service the snooped DCBF request. If not, the process passes to block 624, which has been described. If, however, a local MC SN machine 222 is available to service the snooped DCBF request, dispatch logic 220 provides a NULL partial response to the snooped DCBF request (block 623) and dispatches an idle MC SN machine 222 to handle the snooped DCBF request (block 626). For a DCBF request, the function of the dispatched MC SN machine 222 is to protect the target cache line by causing dispatch logic 220 to issue RTY partial responses for competing flush and non-write requests during protection window 412a, as indicated at block 620. The processing of the DCBF request by the MC SN machine 222 is described below with reference to FIG. 7A. Following block 626, the process of FIG. 6A returns to block 602, which has been described.

Referring now to block 630, dispatch logic 220 determines whether or not the snooped request is a write request that requests an update of a specified memory block residing in the associated system memory 108. If so, the process passes from block 630 to block 622, which has been described. If, however, dispatch logic 220 determines at block 630 that the snooped request is not a write request targeting a memory block in the associated system memory 108, dispatch logic 220 determines at block 632 whether or not the snooped request requests a cache line of data from the associated system memory 108. If so, dispatch logic 220 determines at block 634 whether or not one of the local MC SN machines 222 is busy servicing a flush or write request to the same target address as specified in the snooped request. If so, the process passes through page connector A, dispatch logic 220 provides a RTY partial response for the snooped request (block 624), and the process of FIG. 6A returns to block 602. If, however, dispatch logic 220 makes a negative determination at block 634 or block 632, dispatch logic 220 performs other processing, as shown at block 636. This additional processing can include, among other things, providing an appropriate partial response to the snooped request and/or allocating a MC SN machine 222 to service the snooped request. Following block 636, the process of FIG. 6A returns to block 602.

Referring now to FIG. 6B, the process begins at page connector B and then proceeds to block 610, which illustrates a determination of whether one of the local MC SN machines 222 is busy servicing a DCBFPS request to the same target address as that specified by the DCBFPS request snooped at block 602 and is in a Done phase, as described below with reference to block 716 of FIG. 7B. If so, dispatch logic 220 indicates that the MC SN machine 222 in the Done phase is to be released (block 612) and provides a NULL partial response to the DCBFPS request snooped at block 602 (block 614). This NULL partial response will allow an ACK combined response to be computed by the process of FIG. 10 as described below, thus signaling to the initiating RC machine 334 that the DCBFPS request has successfully completed flushing the target cache line to persistent memory devices 210. Following block 614, the process of FIG. 6B returns to block 602 of FIG. 6A through page connector C.

Returning to block 610, in response to a negative determination, dispatch logic 220 provides a RTY partial response to the snooped DCBFPS request (block 616). As described below with reference to FIG. 10, this RTY partial response will cause a RTY combined response to be provided to the RC machine 334 that issued the DCBFPS request. Following block 616, the process of FIG. 6B proceeds to block 621. At block 621, dispatch logic 220 determines whether or not any local MC SN machine 222 is currently busy servicing a flush or non-write request to the same target address as the DCBFPS request snooped at block 602. If so, the process of FIG. 6B returns through page connector C to block 602, which has been described. If, however a determination is made at block 621 that no local MC SN machine 222 is currently busy servicing a flush or non-write request to the same target address as the DCBFPS request snooped at block 602, dispatch logic 222 additionally determines at block 623 whether or not an MC SN machine 222 of its memory controller 106 is idle and thus currently available to service the snooped DCBFPS request. If not, the process returns through page connector C to block 602. If, however, a local MC SN machine 222 is available to service the snooped DCBFPS request, dispatch logic 220 dispatches an idle MC SN machine 222 to service the snooped DCBFPS request (block 627). The processing of the DCBFPS request by the MC SN machine 222 is described below with reference to FIG. 7B. Following block 627, the process of FIG. 6B returns through page connector C to block 602, which has been described. By comparison of FIGS. 6A and 6B, it should be appreciated that in servicing a DCBFPS request, dispatch logic 220 provides a RTY partial response despite allocating a MC SN machine 222 to service the DCBFPS request in order to indicate that the target cache line has not yet been flushed to its ultimate repository, namely, persistent memory devices 210.

Figure 7A:
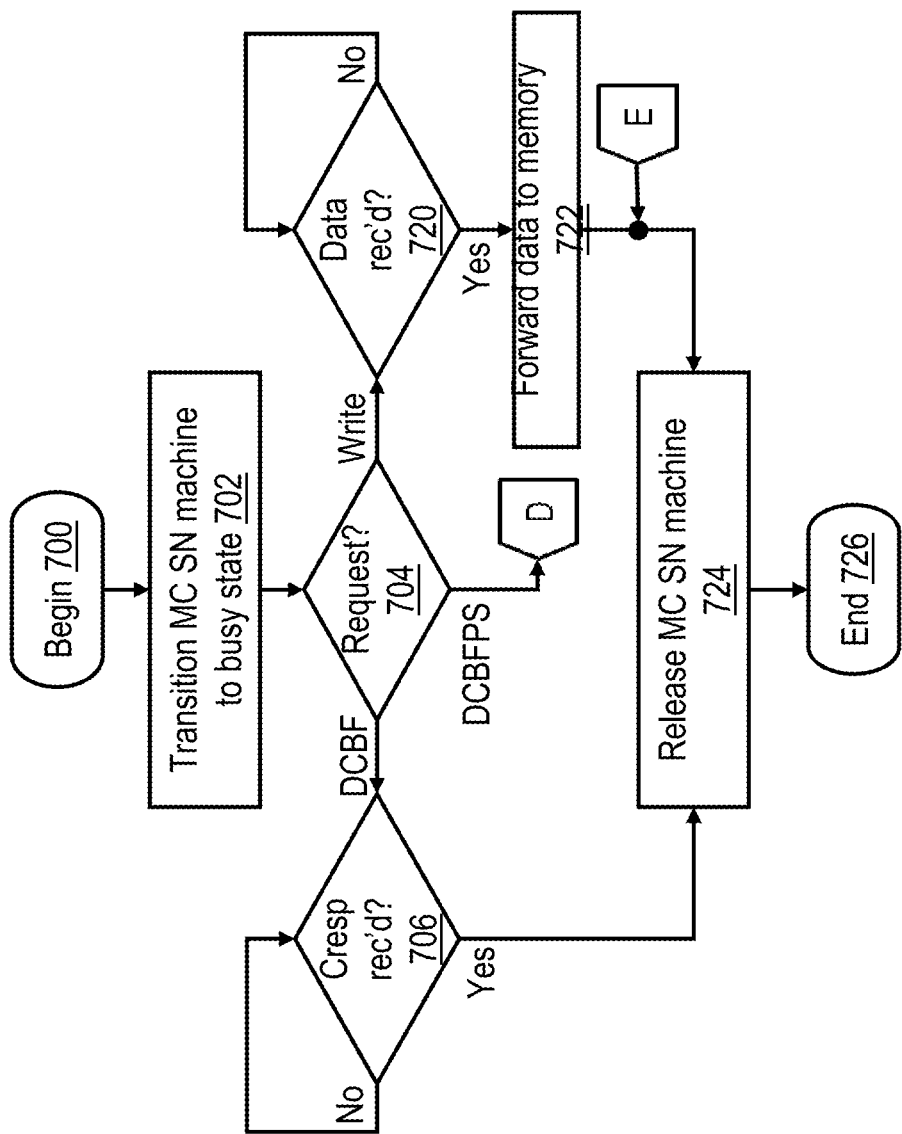
FIG. 7A-7B together form a high level logical flowchart of an exemplary method by which a snoop machine of a memory controller of a system memory handles snooped flush requests in accordance with one embodiment.
Figure 7B:
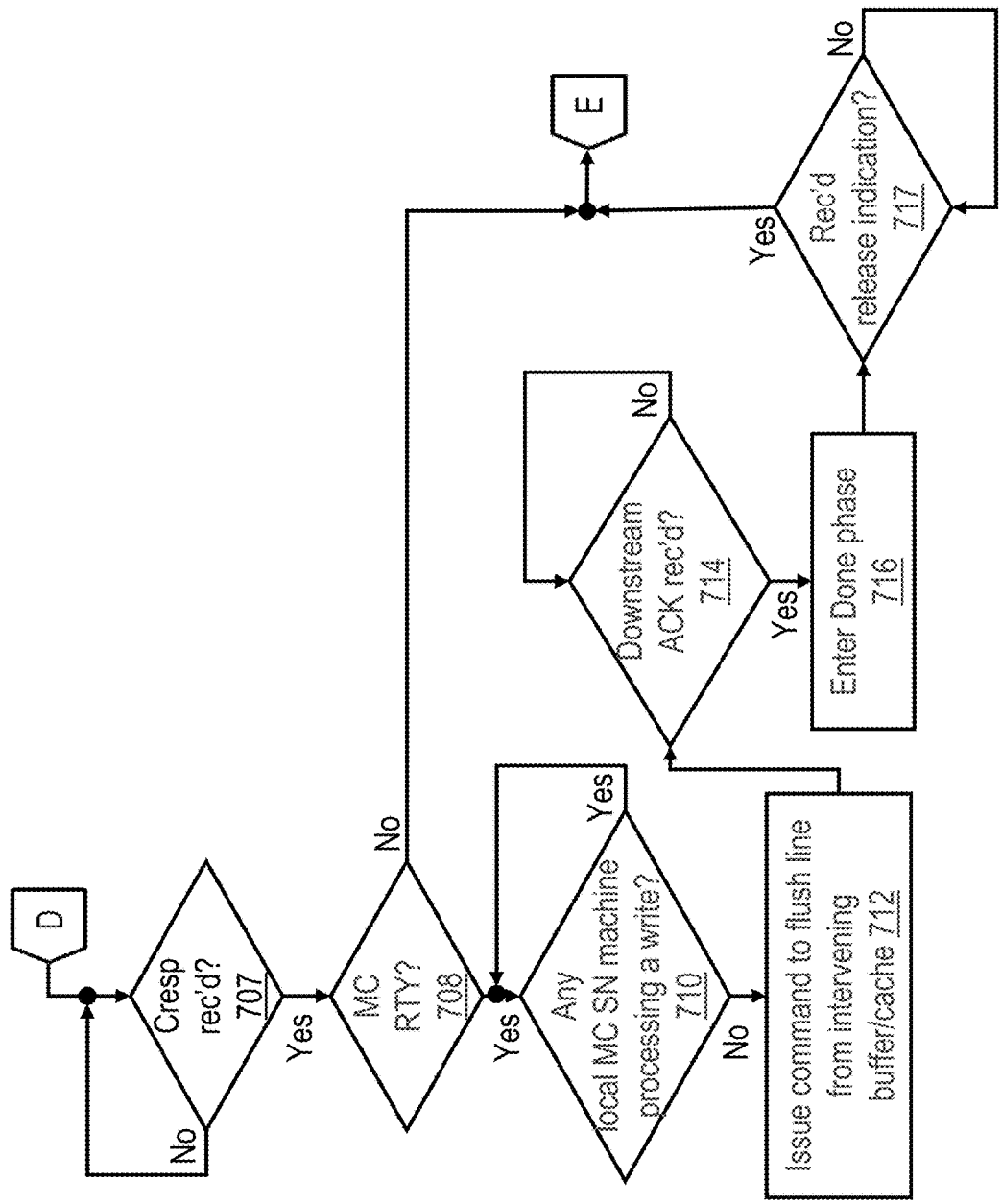

Referring now to FIGS. 7A-7B, there is illustrated a high level logical flowchart of an exemplary method by which a MC SN machine 222 of a memory controller 106 of a system memory 108 handles snooped flush and write requests in accordance with one embodiment. Handling of other types of requests that are not germane to the disclosed inventions are not disclosed in FIGS. 7A-7B or discussed further herein.

The illustrated process begins at block 700, for example, in response to dispatch logic 220 dispatching an idle MC SN machine 222 to service a snooped request. In response to dispatch of the MC SN machine 222, the dispatched MC SN machine 222 transitions from an idle state to a busy state (block 702) and determines at block 704 whether the snooped request is a DCBF, DCBFPS, or write request (block 704). If the snooped request is a DCBF request, the MC SN snooper 222 handles the request as illustrated at block 706 and following blocks, and if the snooped request is a DCBFPS request, the MC SN snooper 222 handles the request as illustrated at block 707 and following blocks of FIG. 7B. If the request is neither a DCBF request nor a DCBFPS request, but is instead a write request, the MC SN snooper 222 handles the request as illustrated at block 720 and following blocks.

Referring first to block 706 of FIG. 7A, to handle a DCBF request, the MC SN machine 222 waits at block 706 until the combined response of the DCBF request is received. In response to receipt of the combined response, the MC SN machine 222 is released and returns to an idle state (block 724). Thereafter, the process of FIG. 7A ends at block 726.

Referring now to block 720, to handle a write request, the MC SN machine 222 waits at block 720 until the write data of the write request is received. In response to receipt of the write data, the MC SN machine 222 forwards the write data to the associated system memory 108 (block 722). Depending on the caching policy implemented by non-persistent memory cache 212, the data may be written into non-persistent memory cache 212 and/or persistent memory devices 210. Thereafter, the process of FIG. 7A passes to blocks 724-726, which have been described.

With reference now to block 707 of FIG. 7B, to handle a DCBFPS request, the MC SN machine 222 waits at block 707 until the combined response of the DCBFPS request is received. In response to receipt of the combined response, the MC SN machine 222 determines at block 708 whether or not the combined response is a MC RTY indicating that the only non-NULL partial response provided for the snooped request was a RTY partial response provided by a memory controller 106. If not, meaning that one or more other coherence participants (e.g., L2 SN machines 336) are still working on the target cache line, the process passes through page connector E to blocks 724-726, which have been described. If, however, the MC SN machine 222 determines at block 708 that the combined response is MC RTY, MC SN machine 222 determines at block 710 whether or not any other local MC SN machine 222 is processing a Write request targeting the same memory block as the DCBFPS request. Such a Write request, if present, may update non-persistent memory cache 212 with the write data. In response to an affirmative determination at block 710, the MC SN machine 222 waits until the Write request is completed, as indicated by the process iterating at block 710 until a negative determination is made. Waiting at block 710 until any pending Write request completes ensures that the associated write data will be in the non-persistent memory cache 212 when the flush command is subsequently issued in block 712.

Following the completion of any pending write request to the target cache line of the DCBFPS request at block 710, the MC SN machine 222 issues a flush command, via request channel 216, to non-persistent memory cache 212 (and/or any other buffering or caching structures intermediate memory controller 106 and persistent memory devices 210) to flush the target cache line (block 712). The flush command causes non-persistent memory cache 212 to write the target cache line, if present in non-persistent memory cache 212, into persistent memory devices 210. Next, at block 714, the MC SN machine 222 awaits receipt via response channel 218 of a downstream ACK response from non-persistent memory cache 212 indicating that the flush commanded at block 712 has completed. In response to receipt of the downstream ACK response via response channel 218, the MC SN machine 222 enters a Done phase as discussed above with reference to block 610 (block 716). As illustrated at block 717, the MC SN machine 222 then awaits a release indication, as discussed above with reference to block 612 of FIG. 6B. In response to receipt of the release indication, processing of the DCBFPS request by the MC SN machine 222 is complete, the process passes through page connector E to blocks 724-726, which have been described.

Referring now to FIG. 8, there is depicted a high level logical flowchart of an exemplary method by which dispatch logic of a processing unit processes a flush request in accordance with one embodiment. The illustrated process can be performed, for example, by each L2 cache 230 of each processing unit 104 in data processing system 100.

The process of FIG. 8 begins at block 800 and then proceeds to block 802, which illustrates an L2 cache 230 monitoring for receipt of a request from the interconnect fabric of data processing system 100. In response to snooping a request on the interconnect fabric, L2 cache 230 determines at block 804 whether or not the snooped request is a DCBF or DCBFPS request. If not, L2 cache 230 performs other processing, as illustrated at block 806. If, however, L2 cache 230 determines at block 804 that the snooped request is a DCBF or DCBFPS request, L2 cache 230 determines at block 810 whether or not one of its local L2 SN machines 336 is currently busy servicing another snooped request specifying the same target address as the snooped DCBF or DCBFPS request. If so, L2 cache 230 provides a SHD (Shared) or RTY partial response, as required by the selected cache coherence protocol (block 812). For example, L2 cache 230 may provide a SHD partial response if the coherence state recorded in L2 directory 322 indicates that L2 array 320 holds a shared copy of the target cache line and may provide a RTY partial response if L2 directory 322 indicates that L2 array 320 holds a modified copy of the target cache line.

Returning to block 810, if L2 cache 230 determines that one of the local L2 SN machines 336 is not busy servicing another snooped request specifying the same target address as the snooped DCBF or DCBFPS request, L2 cache 230 additionally determines at block 814 whether or not the target address specified by the DCBF or DCBFPS request hits or misses in L2 directory 322. If the target address specified by the DCBF or DCBFPS request misses in L2 directory 322, L2 cache 230 provides a NULL partial response, indicating that this L2 cache 230 does not hold a copy of the target cache line in L2 array 320 (block 816). Following any of blocks 806, 812 or 816, the process of FIG. 8 returns to block 802 without requiring dispatch of an L2 SN machine 336.

However, in response to a determination at block 814 that the target address of the DCBF or DCBFPS request hits in L2 directory 322, L2 cache 230 provides a SHD or RTY partial response, as required by the selected cache coherence protocol (block 820). For example, L2 cache 230 may provide a SHD partial response if the coherence state recorded in L2 directory 322 indicates that L2 array 320 holds a shared copy of the target cache line and may provide a RTY partial response if L2 directory 322 indicates that L2 array 320 holds a modified copy of the target cache line. Additionally, at block 822, L2 cache 230 determines if one of its L2 SN machines 336 is in an idle state and thus available for allocation to service the snooped flush request.

If not, the process returns to block 802. If, however, L2 cache 230 determines at block 822 that one of its L2 SN machines 336 is in an idle state and thus available for allocation to service the snooped flush request, L2 cache 230 dispatches one of its L2 SN machines 336 to service the snooped flush request (block 824) as described further below with respect to FIG. 9.

Figure 9:
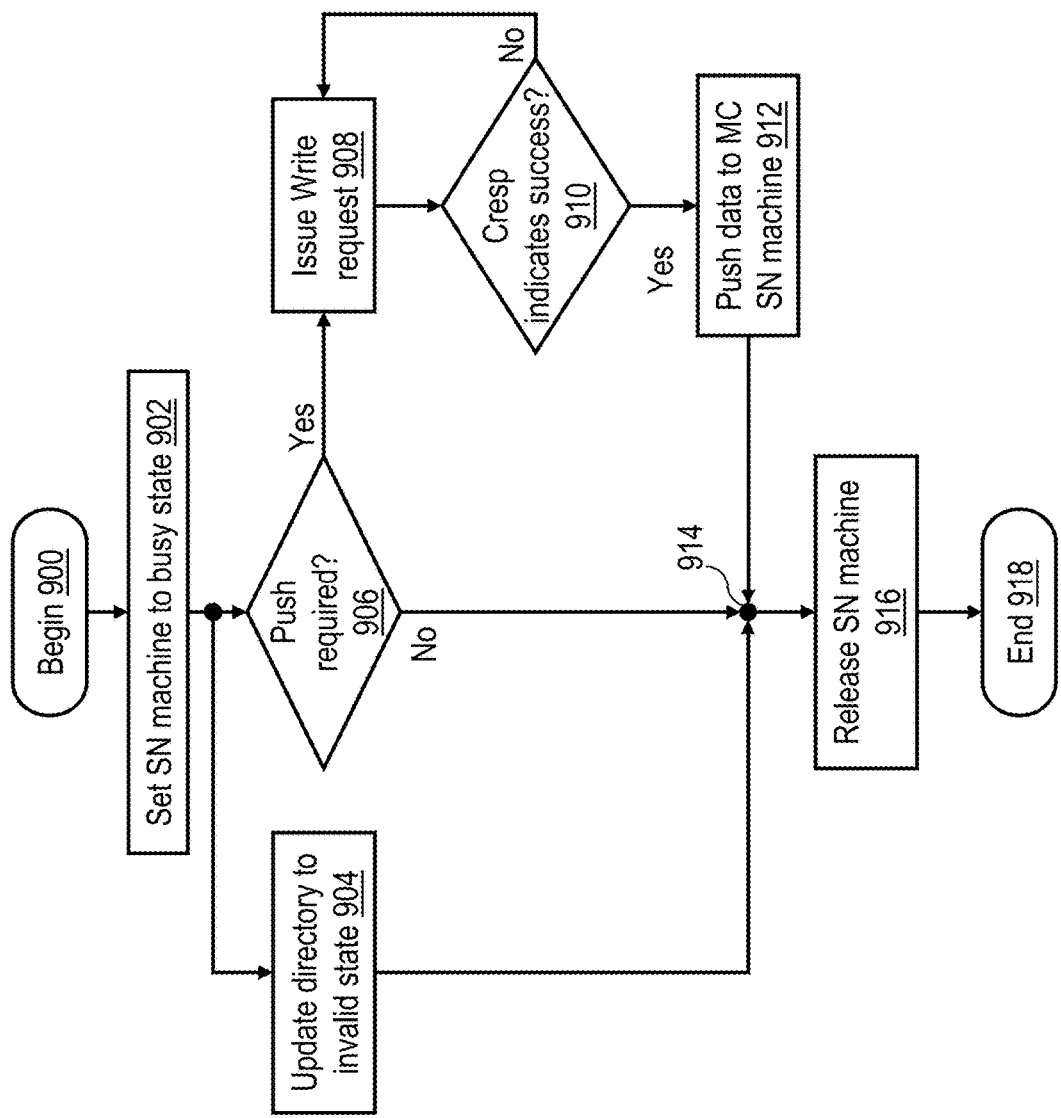
FIG. 9 is a high level logical flowchart of an exemplary method by which a snoop machine of a processing unit handles snooped flush requests in accordance with one embodiment.

With reference now to FIG. 9, there is illustrated a high level logical flowchart of an exemplary method by which a snoop machine of a processing unit processes a flush request in accordance with one embodiment. The depicted process may be performed, for example, by an L2 SN machine 336 of an L2 cache 230.

The process of FIG. 9 begins at block 900, for example, in response to dispatch of an L2 SN machine 336 to service a DCBF or DCBFPS request at block 824 of FIG. 8. In response to dispatch, the L2 SN machine 336 transitions from an idle state to a busy state (block 902) and determines at block 906 whether or not a push of modified data from the local L2 cache 230 is required to service the flush request. For example, a push may be required to service the flush request if the initial coherence state recorded in L2 directory 322 indicates that L2 cache 230 holds a modified copy of the target cache line and is designated by the coherence protocol as responsible for writing the modified data back to system memory 108. In response to a negative determination at block 906, the process passes to join point 914. However, in response to an affirmative determination at block 906, the process proceeds to block 908.

Block 908 depicts the L2 SN machine 336 issuing a Write request on the interconnect fabric to write the modified copy of the target cache line of the snooped flush request back to system memory 108. As indicated by block 910, the L2 SN machine 336 continues to issue the Write request until the Write request receives a combined response indicating success. For example, the Write request may receive a combined response other than a successful combined response (e.g., a RTY combined response), among other reasons, if the relevant memory controller 106 does not have a MC SN machine 222 to allocate to the Write request. In response to receipt of a combined response indicating success at block 910, the L2 SN machine 336 pushes its modified copy of the target cache line to a MC SN machine 222 (block 912). Thereafter, the process proceeds to join point 914.

In parallel with the operations illustrated at block 906 and, if necessary, blocks 908-912, the L2 SN machine 336 also updates L2 directory 322 to invalidate the copy of the target cache line held in the local L2 array 320 (block 904). From block 904, the process then proceeds to join point 914. Once all legs of the process depicted in FIG. 9 have reached join point 914, L2 SN machine 336 is released and returns to an idle state (block 916). Thereafter, the process of FIG. 9 ends at block 918.

Figure 10:
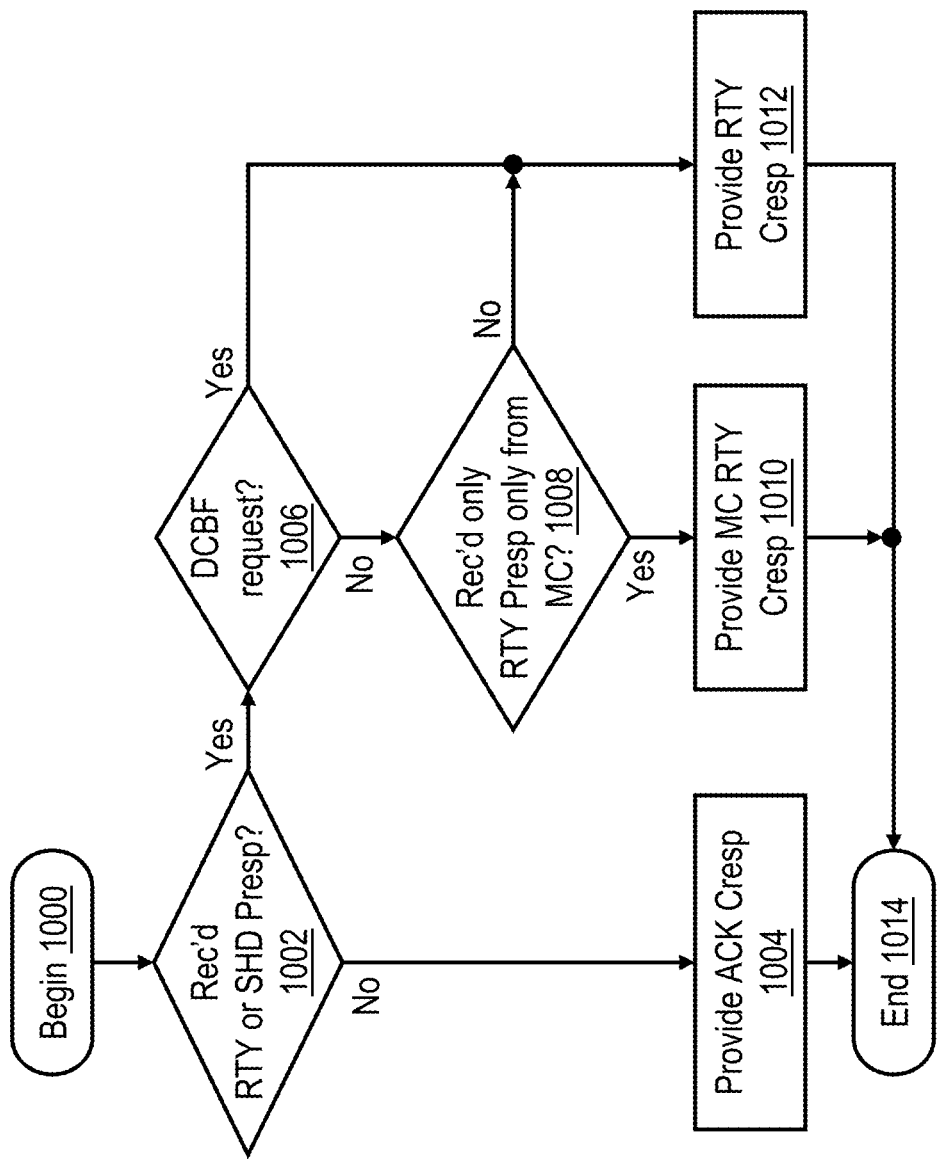
FIG. 10 is a high level logical flowchart of an exemplary method by which response logic determines a combined response of a flush request in accordance with one embodiment.

Referring now to FIG. 10, there is depicted a high level logical flowchart of an exemplary method by which response logic determines a combined response of a flush request in accordance with one embodiment. As noted above, in a preferred embodiment, the process of FIG. 10 is performed by the instance of response logic 238 local to (i.e., in the same processing unit 104 as) the RC machine 334 that initiates the flush request.

The process of FIG. 10 begins at block 1000 and then proceeds to block 1002, which illustrates response logic 238 determining whether or not any RTY or SHD partial response to a pending DCBF or DCBFPS request was received. If no RTY or SHD partial response was received in response to a pending DCBF or DCBFPS request, response logic 238 generates and broadcasts on the interconnect fabric an ACK combined response, as discussed above with reference to block 510 (block 1004). If, however, response logic 238 received at least one SHD or RTY partial response to the DCBF or DCBFPS request, response logic 236 determines at block 1006 whether or not the flush request for which the combined response is being computed was a DCBF request. If so, response logic 238 generates and broadcasts on the interconnect fabric a RTY combined response (block 1012). If, however, response logic 238 instead determines at block 1006 that the flush request was a DCBFPS request, response logic 238 additionally determines at block 1008 whether or not response logic 238 received no SHD partial response and only a single RTY partial response from a MC SN machine 222. If not, response logic 238 generates and broadcasts on the interconnect fabric a RTY combined response for the DCBFPS request (block 1012). If, however, response logic 238 determines at block 1008 that it received no SHD partial response and only a single RTY partial response from a MC SN machine 222, response logic 222 generates and broadcasts on the interconnect fabric a MC RTY combined response (block 1010), as discussed above with reference to block 708 of FIG. 7. Following any of blocks 1004, 1010, or 1012, the process of FIG. 10 ends at block 1014.

Figure 11:
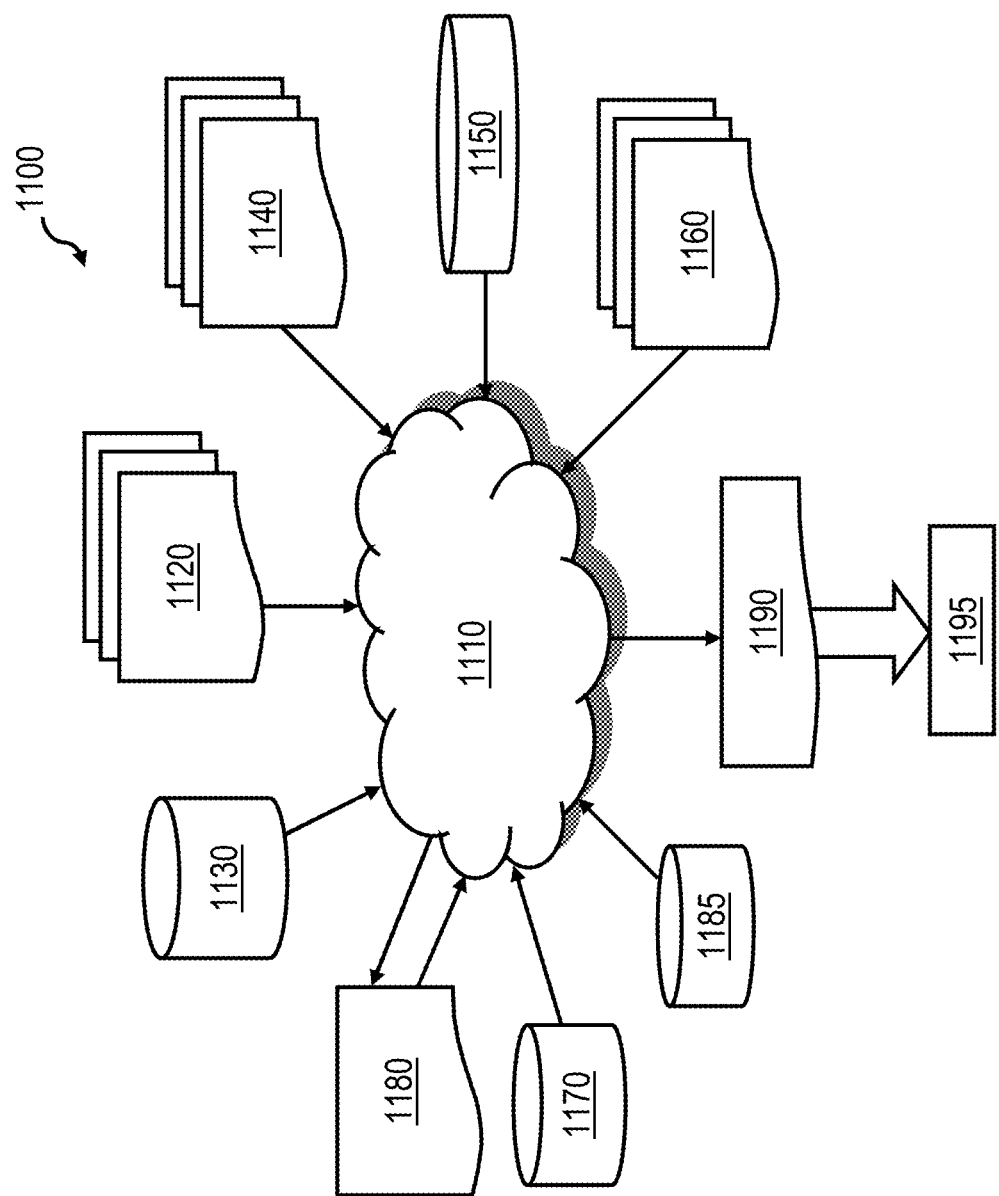
FIG. 11 is a data flow diagram illustrating a design process.

With reference now to FIG. 11, there is depicted a block diagram of an exemplary design flow 1100 used for example, in semiconductor IC logic design, simulation, test, layout, and manufacture. Design flow 1100 includes processes, machines and/or mechanisms for processing design structures or devices to generate logically or otherwise functionally equivalent representations of the design structures and/or devices described above and shown in FIGS. 1-3. The design structures processed and/or generated by design flow 1100 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1100 may vary depending on the type of representation being designed. For example, a design flow 1100 for building an application specific IC (ASIC) may differ from a design flow 1100 for designing a standard component or from a design flow 1100 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 1120 that is preferably processed by a design process 1100. Design structure 1120 may be a logical simulation design structure generated and processed by design process 1100 to produce a logically equivalent functional representation of a hardware device. Design structure 1120 may also or alternatively comprise data and/or program instructions that when processed by design process 1100, generate a functional representation of the physical structure of a hardware device. Whether representing functional and/or structural design features, design structure 1120 may be generated using electronic computer-aided design (ECAD) such as implemented by a core developer/designer. When encoded on a machine-readable data transmission, gate array, or storage medium, design structure 1120 may be accessed and processed by one or more hardware and/or software modules within design process 1100 to simulate or otherwise functionally represent an electronic component, circuit, electronic or logic module, apparatus, device, or system such as those shown in FIGS. 1-3. As such, design structure 1120 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1100 preferably employs and incorporates hardware and/or software modules for synthesizing, translating, or otherwise processing a design/simulation functional equivalent of the components, circuits, devices, or logic structures shown in FIGS. 1-3 to generate a netlist 1180 which may contain design structures such as design structure 1120. Netlist 1180 may comprise, for example, compiled or otherwise processed data structures representing a list of wires, discrete components, logic gates, control circuits, I/O devices, models, etc. that describes the connections to other elements and circuits in an integrated circuit design. Netlist 1180 may be synthesized using an iterative process in which netlist 1180 is resynthesized one or more times depending on design specifications and parameters for the device. As with other design structure types described herein, netlist 1180 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1100 may include hardware and software modules for processing a variety of input data structure types including netlist 1180. Such data structure types may reside, for example, within library elements 1130 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1140, characterization data 1150, verification data 1160, design rules 1170, and test data files 1185 which may include input test patterns, output test results, and other testing information. Design process 1100 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1100 without deviating from the scope and spirit of the invention. Design process 1100 may also include modules for performing standard circuit design processes such as timing analysis, verification, design rule checking, place and route operations, etc.

Design process 1100 employs and incorporates logic and physical design tools such as HDL compilers and simulation model build tools to process design structure 1120 together with some or all of the depicted supporting data structures along with any additional mechanical design or data (if applicable), to generate a second design structure 1190. Design structure 1190 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1120, design structure 1190 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-3. In one embodiment, design structure 1190 may comprise a compiled, executable HDL simulation model that functionally simulates the devices shown in FIGS. 1-3.

Design structure 1190 may also employ a data format used for the exchange of layout data of integrated circuits and/or symbolic data format (e.g., information stored in a GDSII (GDS2), GL1, OASIS, map files, or any other suitable format for storing such design data structures). Design structure 1190 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-3. Design structure 1190 may then proceed to a stage 1195 where, for example, design structure 1190: proceeds to tape-out, is released to manufacturing, is released to a mask house, is sent to another design house, is sent back to the customer, etc.

As has been described, in at least one embodiment, a data processing system includes a plurality of processing units and a system memory coupled to a memory controller. The system memory includes a persistent memory device and a non-persistent cache interposed between the memory controller and the persistent memory device. The memory controller receives a flush request of a particular processing unit among the plurality of processing units, the flush request specifying a target address. The memory controller, responsive to the flush request, ensures flushing of a target cache line of data identified by target address from the non-persistent cache into the persistent memory device.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a plurality of processing units, an interconnect fabric, a memory controller coupled to the plurality of processing units by the interconnect fabric, and a system memory coupled to the memory controller, the system memory including a persistent memory device and a non-persistent cache interposed between the memory controller and the persistent memory device, the method comprising:
   the memory controller controlling read and write access to the system memory based on memory access requests received from the plurality of processing units on the interconnect fabric, wherein the controlling includes:
      receiving on the interconnect fabric a flush request of a particular processing unit among the plurality of processing units that initiated the flush request, the flush request specifying a target address; and
      the memory controller, based on receipt of the flush request, ensuring flushing of a target cache line of data identified by target address from the non-persistent cache into the persistent memory device, wherein the ensuring flushing includes the memory controller, based on receipt of a coherence message indicating that the memory controller is an only snooping coherence participant in the data processing system processing the flush request and based on completion of a pending local write request to the target cache, issuing a flush command to the non-persistent cache that initiates flushing of the target cache into the persistent memory device.

2. The method of claim 1, wherein:
the flush request is a second flush request; and
the method further comprises:
   the memory controller, based on receiving on the interconnect fabric a first flush request specifying the target address by the particular processing unit previous to the second flush request, preventing the first flush request from completing successfully by providing a first partial response representing an individual coherence response of the memory controller to the first flush request, wherein the memory controller provides the first partial response to flush requests for the target address until confirmation is received that the target cache line of data identified by the target address has been flushed from the non-persistent cache into the persistent memory device.

3. The method of claim 2, and further comprising:
the memory controller, based on receiving on the interconnect fabric the second flush request subsequent to the first flush request, allowing the second flush request to complete successfully by providing a different second partial response representing an individual coherence response of the memory controller to the second flush request.

4. The method of claim 1, wherein the ensuring flushing includes allowing the flush request to complete successfully based on receipt of an acknowledgment of completion of the flush command from the non-persistent cache.

5. A memory controller for a data processing system including a plurality of processing units, an interconnect fabric, and a system memory coupled to the memory controller, the system memory including a persistent memory device and a non-persistent cache interposed between the memory controller and the persistent memory device, wherein the memory controller comprises integrated circuitry configured to perform:
the memory controller controlling read and write access to the system memory based on memory access requests received from the plurality of processing units on the interconnect fabric, wherein the controlling includes:
receiving on the interconnect fabric a flush request of a particular processing unit among the plurality of processing units that initiated the flush request, the flush request specifying a target address; and
the memory controller, based on receipt of the flush request, ensuring flushing of a target cache line of data identified by target address from the non-persistent cache into the persistent memory device, wherein the ensuring flushing includes the memory controller, based on receipt of a coherence message indicating that the memory controller is an only snooping coherence participant in the data processing system processing the flush request and based on completion of a pending local write request to the target cache, issuing a flush command to the non-persistent cache that initiates flushing of the target cache into the persistent memory device.

6. The memory controller of claim 5, wherein:
the flush request is a second flush request; and
the memory controller is further configured to perform:
based on receiving on the interconnect fabric a first flush request specifying the target address by the particular processing unit previous to the second flush request, preventing the first flush request from completing successfully by providing a first partial response representing an individual coherence response of the memory controller to the first flush request, wherein the memory controller provides the first partial response to flush requests for the target address until confirmation is received that the target cache line of data identified by the target address has been flushed from the non-persistent cache into the persistent memory device.

7. The memory controller of claim 6, wherein the memory controller is further configured to perform:
based on receiving on the interconnect fabric the second flush request subsequent to the first flush request, allowing the second flush request to complete successfully by providing a different second partial response representing an individual coherence response of the memory controller to the second flush request.

8. The memory controller of claim 5, wherein the ensuring flushing includes allowing the flush request to complete successfully based on receipt of an acknowledgment of completion of the flush command from the non-persistent cache.

9. A data processing system comprising:
the plurality of processing units;
the memory controller of claim 5;
the system memory coupled to the memory controller; and
an interconnect fabric communicatively coupling the plurality of processing units and the memory controller.

10. A design structure tangibly embodied in a machine-readable storage device for designing, manufacturing, or testing an integrated circuit, the design structure comprising:
a memory controller for a data processing system including a plurality of processing units, an interconnect fabric, and a system memory coupled to the memory controller, the system memory including a persistent memory device and a non-persistent cache interposed between the memory controller and the persistent memory device, wherein the memory controller comprises integrated circuitry configured to perform:
the memory controller controlling read and write access to the system memory based on memory access requests received from the plurality of processing units on the interconnect fabric, wherein the controlling includes:
receiving on the interconnect fabric a flush request of a particular processing unit among the plurality of processing units that initiated the flush request, the flush request specifying a target address; and
the memory controller, based on receipt of the flush request, ensuring flushing of a target cache line of data identified by target address from the non-persistent cache into the persistent memory device, wherein the ensuring flushing includes the memory controller, based on receipt of a coherence message indicating that the memory controller is an only snooping coherence participant in the data processing system processing the flush request and based on completion of a pending local write request to the target cache, issuing a flush command to the non-persistent cache that initiates flushing of the target cache into the Persistent memory device.

11. The design structure of claim 10, wherein:
the flush request is a second flush request; and
the memory controller is further configured to perform:
based on receiving on the interconnect fabric a first flush request specifying the target address by the particular processing unit previous to the second flush request, preventing the first flush request from completing successfully by providing a first partial response representing an individual coherence response of the memory controller to the first flush request, wherein the memory controller provides the first partial response to flush requests for the target address until confirmation is received that the target cache line of data identified by the target address has been flushed from the non-persistent cache into the persistent memory device.

12. The design structure of claim 11, wherein the memory controller is further configured to perform:
based on receiving on the interconnect fabric the second flush request subsequent to the first flush request, allowing the second flush request to complete successfully by providing a different second partial response representing an individual coherence response of the memory controller to the second flush request.

13. The design structure of claim 10, wherein the ensuring flushing includes allowing the flush request to complete successfully based on receipt of an acknowledgment of completion of the flush command from the non-persistent cache.

* * * * *